United States Patent
Deguchi

(10) Patent No.: US 9,797,363 B2
(45) Date of Patent: Oct. 24, 2017

(54) CONTROL APPARATUS FOR AN INTERNAL COMBUSTION ENGINE

(71) Applicant: DENSO CORPORATION, Kariya, Aichi-pref. (JP)

(72) Inventor: Masataka Deguchi, Chiryu (JP)

(73) Assignee: DENSO CORPORATION, Kariya (JP)

( * ) Notice: Subject to any disclaimer, the term of this patent is extended or adjusted under 35 U.S.C. 154(b) by 350 days.

(21) Appl. No.: 14/554,742

(22) Filed: Nov. 26, 2014

(65) Prior Publication Data
US 2015/0144101 A1 May 28, 2015

(30) Foreign Application Priority Data

Nov. 28, 2013 (JP) .................................. 2013-245932

(51) Int. Cl.
*F02P 3/02* (2006.01)
*F02P 9/00* (2006.01)
(Continued)

(52) U.S. Cl.
CPC ................. *F02P 3/02* (2013.01); *F02P 9/002* (2013.01); *F02P 17/12* (2013.01); *G01M 15/11* (2013.01); *F02P 17/00* (2013.01)

(58) Field of Classification Search
CPC ...... F02P 2017/121; F02P 3/055; F02P 17/00; F02P 17/12; F02P 3/02; F02P 9/002; G01M 15/11
(Continued)

(56) References Cited

U.S. PATENT DOCUMENTS 5,503,132 A * 4/1996 Miyata .................... F02P 15/08
123/630
5,617,032 A * 4/1997 Inagaki ................... F02P 17/12
123/630
(Continued)

FOREIGN PATENT DOCUMENTS

DE 4133253 A1 * 4/1993 ............ F02P 3/0552
JP 6-129333 5/1994
(Continued)

OTHER PUBLICATIONS 161222 www.Denso Spark Plugs—Basic Knowledge w Wayback backdate.*

(Continued)

*Primary Examiner* — Carlos A Rivera
*Assistant Examiner* — Carl Staubach
(74) *Attorney, Agent, or Firm* — Nixon & Vanderhye P.C.

(57) ABSTRACT

A control apparatus, which is for an internal combustion engine with a spark plug having a center electrode and a ground electrode disposed so as to form a spark discharge gap therebetween, includes a voltage applying section for applying a voltage to the spark discharge gap, a constant-voltage path including a constant-voltage element parallel-connected to the spark discharge gap of the spark plug for preventing the spark discharge gap from being applied with a voltage higher than a set voltage, and an operation control circuit for controlling an operating condition of the internal combustion engine. The operation control circuit is configured to measure a current-flowing time during which a current flows through the constant-voltage path when a voltage higher than the set voltage is applied to the constant-voltage path, and change the operating condition of the internal combustion engine in accordance with the measured current-flowing time.

5 Claims, 7 Drawing Sheets

(51) Int. Cl.
*F02P 17/12* (2006.01)
*G01M 15/11* (2006.01)
*F02P 17/00* (2006.01)

(58) Field of Classification Search
USPC ...... 123/406.11–406.52, 605, 609–611, 623, 123/629, 654, 656
See application file for complete search history.

(56) References Cited

U.S. PATENT DOCUMENTS

| | | | | |
|---|---|---|---|---|
| 5,701,077 | A * | 12/1997 | Inagaki | F02P 17/12 123/630 |
| 6,118,276 | A * | 9/2000 | Nakata | F02P 17/12 324/380 |
| 6,539,930 | B2 * | 4/2003 | Inagaki | F02P 9/007 123/655 |
| 6,920,783 | B2 * | 7/2005 | Kesler | G01M 15/11 73/114.08 |
| 7,347,195 | B2 * | 3/2008 | Biljenga | F02P 9/007 123/620 |
| 2007/0186903 | A1 * | 8/2007 | Zhu | F01N 3/2006 123/406.37 |
| 2011/0163673 | A1 * | 7/2011 | Haution | F02P 9/007 315/111.21 |
| 2013/0199485 | A1 | 8/2013 | Shibata et al. | |
| 2013/0199510 | A1 * | 8/2013 | Shibata | F02P 1/083 123/634 |
| 2013/0200816 | A1 * | 8/2013 | Shibata | H01T 13/44 315/224 |
| 2013/0206106 | A1 * | 8/2013 | Huberts | F02B 77/08 123/406.27 |

FOREIGN PATENT DOCUMENTS

| | | |
|---|---|---|
| JP | 6-80313 | 10/1994 |
| JP | 2013-160201 | 8/2013 |
| JP | 2013-177881 | 9/2013 |

OTHER PUBLICATIONS

Office Action (2 pgs.) dated Dec. 8, 2015 issued in corresponding Japanese Application No. 2013-245932 with an at least partial English language translation (2 pgs.).

* cited by examiner

CONTROL APPARATUS FOR AN INTERNAL COMBUSTION ENGINE

This application claims priority to Japanese Patent Application No. 2013-245932 filed on Nov. 28, 2013, the entire contents of which are hereby incorporated by reference.

BACKGROUND OF THE INVENTION

1. Field of the Invention

The present invention relates to a control apparatus for an internal combustion engine.

2. Description of Related Art

A spark plug, which is used as an ignition means for an internal combustion engine, includes an insulator holding a center electrode inserted therein, a housing holding the a distal end portion of the insulator inserted therein, and a ground electrode joined to the housing so as to forma spark discharge gap with the center electrode. Insulation of the spark discharge gap is broken to generate a discharge spark between the center electrode and the ground electrode when applied with a high voltage from an ignition coil.

Japanese Examined Patent Application Publication No. H6-80313 describes such a spark plug. The spark plug described in this patent document includes a constant-voltage element which is incorporated in the insulator. When a voltage applied to the constant-voltage element is lower than a set voltage, a current is prohibited from flowing through the constant-voltage element. On the other hand, when the voltage applied to the constant-voltage element is higher than or equal to the set voltage, the resistance of the constant-voltage element is sufficiently reduced to allow a current to pass therethrough. The provision of the constant-voltage element parallel-connected to the spark discharge gap makes it possible to prevent the spark discharge gap from being applied with a voltage higher than the set voltage to thereby reduce variation of the discharge voltage.

However, the spark plug described in the above patent document has a problem as described below. Internal combustion engines with a small-sized supercharger are increasing in number to address the demand of improvement of fuel economy and reduction of the manufacturing cost. In these internal combustion engines, the compression ratio is set higher causing the cylinder pressure to be higher and causing the discharge voltage of the spark plug to be higher.

Further, the center electrode and ground electrode wear more because of increase of the temperature of the combustion chamber, increase of material oxidization in oxidization atmosphere, volume reduction due to spark sputtering and the like. As a result, since the spark discharge gap between the center electrode and the ground electrode increases, the discharge voltage of the spark plug further increases.

Hence, for the spark plug provided with the constant-voltage element to prevent the spark discharge gap from being applied with a voltage higher than the set voltage, there is a concern that it may take a long time before a discharge spark is generated or a discharge spark may not be generated causing a misfire of the internal combustion engine.

SUMMARY

An exemplary embodiment provides a control apparatus for an internal combustion engine with a spark plug having a center electrode and a ground electrode disposed so as to form a spark discharge gap therebetween, including:

a voltage applying section for applying a voltage to the spark discharge gap;

a constant-voltage path including a constant-voltage element parallel-connected to the spark discharge gap of the spark plug for preventing the spark discharge gap from being applied with a voltage higher than a set voltage; and an operation control circuit for controlling an operating condition of the internal combustion engine;

wherein the operation control circuit is configured to measure a current-flowing time during which a current flows through the constant-voltage path when a voltage higher than the set voltage is applied to the constant-voltage path, and change the operating condition of the internal combustion engine in accordance with the measured current-flowing time.

According to the exemplary embodiment, there is provided a control apparatus for an internal combustion engine, which is capable of maintaining an ignition performance of an ignition system including a spark plug and a constant-voltage element for preventing the spark plug from being applied with a voltage higher than a set voltage, even after the spark plug has been deteriorated due to aging.

Other advantages and features of the invention will become apparent from the following description including the drawings and claims.

PREFERRED EMBODIMENTS OF THE INVENTION

First Embodiment

Figure 1:
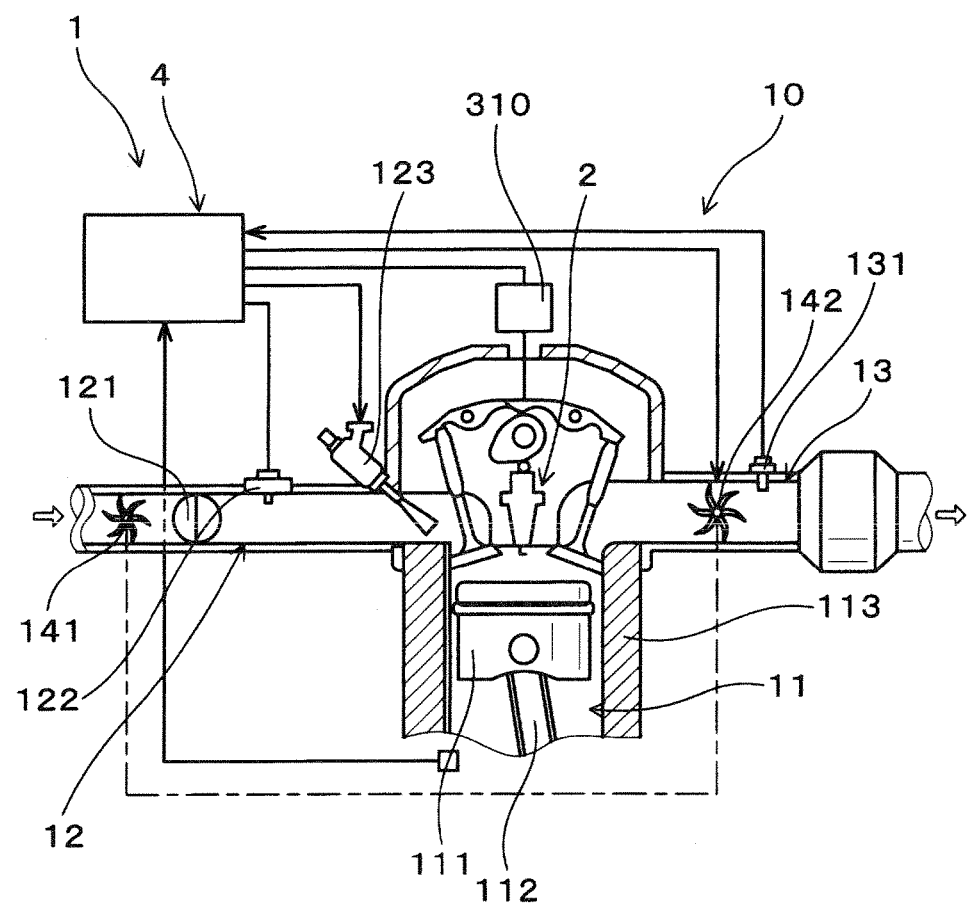
FIG. 1 is a diagram for explaining the structure of an internal combustion engine controlled by a control apparatus according to a first embodiment of the invention.

A control apparatus 1 for an internal combustion engine according to a first embodiment of the invention is described with reference FIGS. 1 to 6. The control apparatus 1 is for controlling an internal combustion engine 10 with at least one spark plug 2 having a spark discharge gap between its center electrode 21 and its ground electrode 22. The control apparatus 1 includes a connection path 31 for electrically connecting the spark plug 2 to an ignition coil 310 as voltage applying means for applying a voltage to the spark plug 2, a constant-voltage path 32 for preventing the spark discharge gap from being applied with a voltage higher than a set voltage $V_Z$, and an operation control circuit 4 for controlling an operating condition of the internal combustion engine 10. The constant-voltage path 32 is provided with a constant-voltage element 321 which is branched from the connection path 31 and parallel-connected to the spark plug 2.

The operation control circuit 4 is configured to be capable of measuring a current-flowing time t during which a current flows through the constant-voltage path 32 when the connection circuit 31 is applied with a voltage higher than the set voltage $V_Z$, and to change the operation condition of the internal combustion engine 10 depending on the measured current-flowing time t.

The structure of the control apparatus 1 is described in detail below. The control apparatus 1 is for controlling the internal combustion engine 10 which is a gasoline engine in this embodiment. The internal combustion engine 10 includes a combustion chamber 11 in which a fuel-air mixture is combusted, an intake passage 12 for supplying the fuel-air mixture to the combustion chamber 11 and an exhaust passage 13 for discharging exhaust gas within the combustion chamber 11.

The combustion chamber 11 includes a columnar piston 111 and a cylinder 113, the piston 111 being contained in the cylinder 113 movably in the axial direction thereof. The piston 111 is connected to a connecting rod 112 and a crankshaft (not shown) to convert linear motion of the piston 111 to rotary motion of the crankshaft. The crankshaft is provided with an angle sensor (not shown) for detecting the rotational angle thereof. The spark plug 2 is mounted on the cylinder 113 such that the center electrode 21 and the ground electrode 22 are exposed to the inside of the combustion chamber 11. When the center electrode 21 is applied with a voltage, a discharge spark is generated in the spark discharge gap between the center electrode 21 and the ground electrode 22.

The intake passage 12, which is in communication with the combustion chamber 11, is provided with an intake compressor 141 of a supercharger, a throttle valve 121, an intake pressure sensor 122 and a fuel injection valve 123. The throttle valve 121 is an electronically controlled valve. By adjusting the opening degree of the throttle valve 121, the flow rate of air supplied to the combustion chamber 11 of the internal combustion engine 10 can be adjusted. The fuel injection valve 123 is an electromagnetically driven valve. An air-fuel mixture is formed by combining fuel injected from the fuel injection valve 123 with air within the intake passage 12. The air-fuel mixture is supplied to the combustion chamber 11 by opening an intake valve provided in the combustion chamber 11.

The exhaust passage 13, which is in communication with the combustion chamber 11, is provided with an exhaust turbine 142 of the supercharger and an air-fuel ratio sensor 131. The air-fuel ratio sensor 131 detects concentrations of oxygen and unburnt components (CO, HC, $H_2$ etc) in the exhaust gas, and outputs an electrical signal reflecting the detection results.

As shown in FIG. 1, the supercharger of the internal combustion engine 10 includes the intake compressor 141 provided in the intake passage 12, the exhaust turbine 142 provided in the exhaust passage 13 and a rotating shaft (not show) connected to the intake compressor 141 and the exhaust turbine 142. The rotation energy of the exhaust turbine 142 rotated by the exhaust gas flowing through the exhaust passage 13 is transferred to the intake compressor 141 through the rotating shaft, causing the compressor 141 to compress or supercharge the intake air. In this embodiment, the supercharger is configured to be capable of adjusting the supercharging pressure. For example, the opening degree of the vanes of the supercharger may be adjustable.

As described in the foregoing, the control apparatus 1 includes the connection path 31 for electrically connecting the spark plug 2 to the ignition coil 310, the constant-voltage path 32 for preventing the spark discharge gap from being applied with a voltage higher than the set voltage $V_Z$, and the operation control circuit 4 for controlling the operating condition of the internal combustion engine 10.

The connection path 31 makes an electrical connection between the center electrode 21 of the spark plug 2 and the ignition coil 310. The ignition coil 310 includes a primary coil 311 and a secondary coil 312 magnetically connected to each other. Each of the primary coil 311 and the secondary coil 312 is formed by winding a wire with a certain number of turns.

Figure 2:
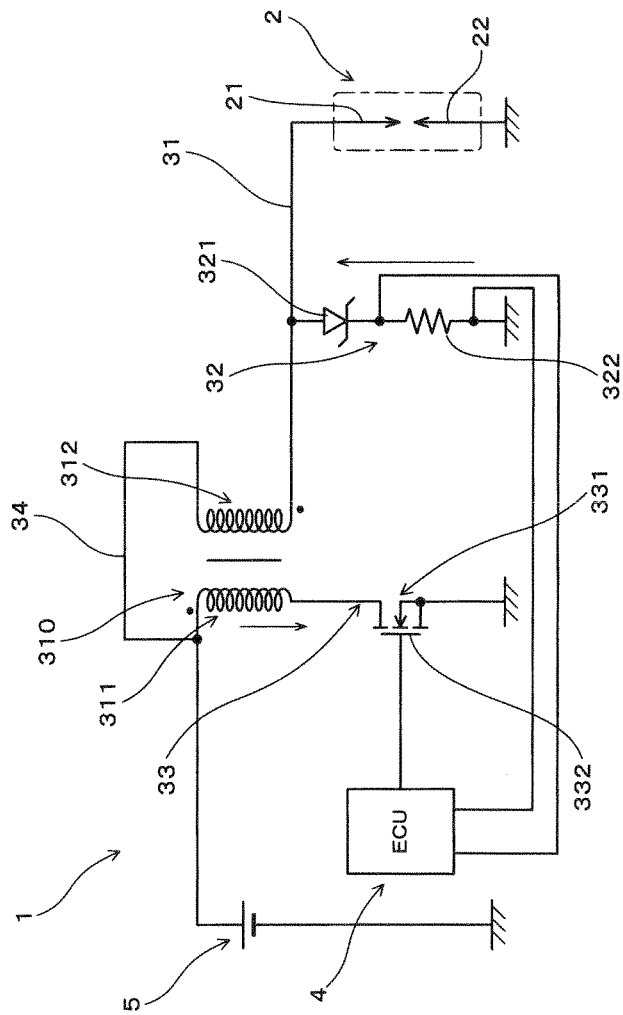
FIG. 2 is a diagram showing the structure of the control apparatus according to the first embodiment of the invention.

As shown in FIG. 2, one end of the primary coil 311 is connected to the positive electrode of a battery 5 mounted on a vehicle, and the other end of the primary coil 311 is connected to a switching path 33. The switching path 33 includes an electronically controlled switching element 331. The switching element 331 is connected to the primary coil 311 at one end thereof, and grounded at the other end thereof. In this embodiment, the switching element 331 is an N-channel MOSFET.

The secondary coil 312 is connected to the positive electrode of the battery 5 at one end thereof through a low-voltage path 34, and connected to the center electrode 21 of the spark plug 2 through the connection path 31 at the other end thereof. The negative electrode of the battery 5 is grounded. In this embodiment, the battery 5 is a 12V lead-acid storage battery, and the ground potential is 0 V.

As shown in FIG. 2, the connection path 31 is connected with the constant-voltage path 32 grounded at its one end. The constant-voltage path 32 is provided with a zener diode as the constant-voltage element 321 and a current detecting resistor 322 disposed in this order from the side of the connection path 31. The constant-voltage element 321 is connected to the connection path 31 at its anode and connected to one end of the resistor 322 the other end of which is grounded.

The operation control circuit 4, which is formed as an ECU constituted mainly of a microcomputer, stores therein relational expressions F1 and F2 between a later explained voltage deviation $V_Y$ and the current-flowing time t. The operation control circuit 4 is configured to be capable of measuring the current-flowing time t during which a current flows through the constant-voltage path 32, deriving the voltage deviation $V_Y$ from the current-flowing time t using later-explained relational expressions F1 and F2, and controlling the operating condition of the internal combustion engine 10 in accordance with the voltage deviation $V_Y$. Although the voltage deviation $V_Y$ is derived using the relational expressions F1 and F2 in this embodiment, it may be derived using a conversion table or map data. The operation control circuit 4 is capable of also performing ignition control for outputting an ignition signal IGt to the control terminal (gate) 332 of the switching element 331 provided in the switching path 33.

The relational expressions F1 and F2 are derived from relational data representing a relationship between the voltage deviation $V_Y$ and the current-flowing time t. The voltage deviation $V_Y$ is the difference between the set voltage $V_Z$ and an increased discharge voltage VX increased from the set voltage $V_Z$ due to deterioration of the spark plug 2. The relational data is obtained in advance through measurement. More specifically, the relational data is obtained by measuring variations of a discharge voltage V and the current-flowing time t when the cylinder pressure is varied as shown in FIGS. 5 and 6.

Figure 5:
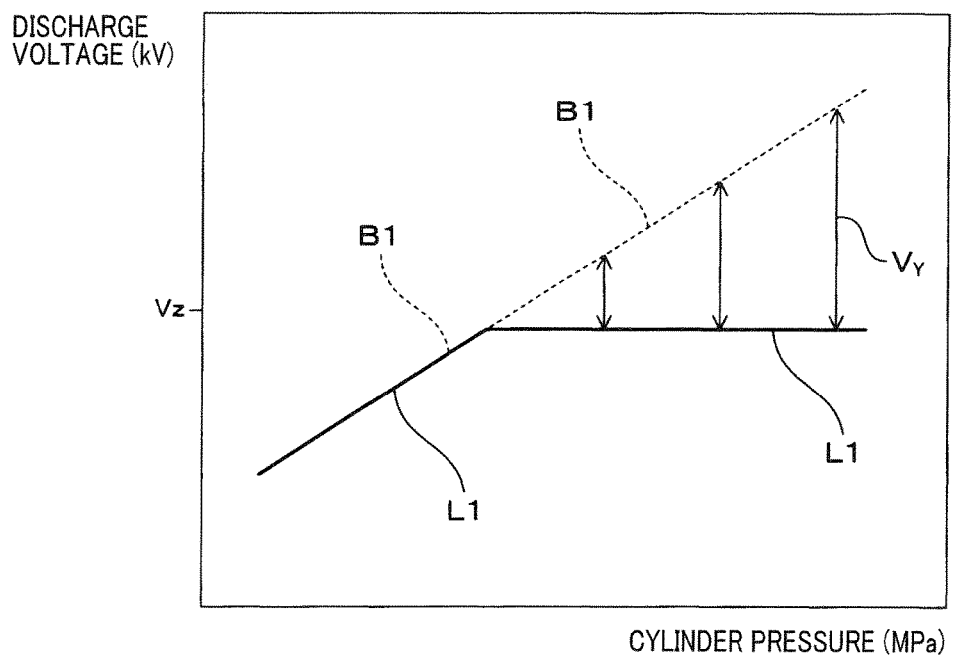
FIG. 5 is a graph showing a relationship between the discharge voltage and the cylinder pressure of an internal combustion engine controlled by the control apparatus according to the first embodiment of the invention.

In the graph of FIG. 5, the vertical axis represents the discharge voltage V (kV) and the horizontal axis represents the cylinder pressure (MPa). The solid line L1 shows how the discharge voltage V of the spark plug 2 varies with the increase of the cylinder pressure when the constant-voltage element 321 is provided. The broken line B1 shows how the discharge voltage V of the spark plug 2 varies with the increase of the cylinder pressure when the constant-voltage element 321 is not provided. In the graph of FIG. 6, the vertical axis represents the current-flowing time t (μs) and the horizontal axis represents the cylinder pressure (MPa). The solid line L2 shows how the current-flowing time t of the spark plug 2 varies with the increase of the cylinder pressure when the constant-voltage element 321 is provided. The broken line B2 shows how the current-flowing time t of the spark plug 2 varies with the increase of the cylinder pressure when the constant-voltage element 321 is not provided. In this embodiment, the relational data is obtained by measuring the variations of the discharge voltage and the current-flowing time when the cylinder pressure is varied. However, the relational data may be obtained by measuring the variations of the discharge voltage and the current-flowing time when the spark discharge gap or fuel-air ratio is varied.

Figure 4:
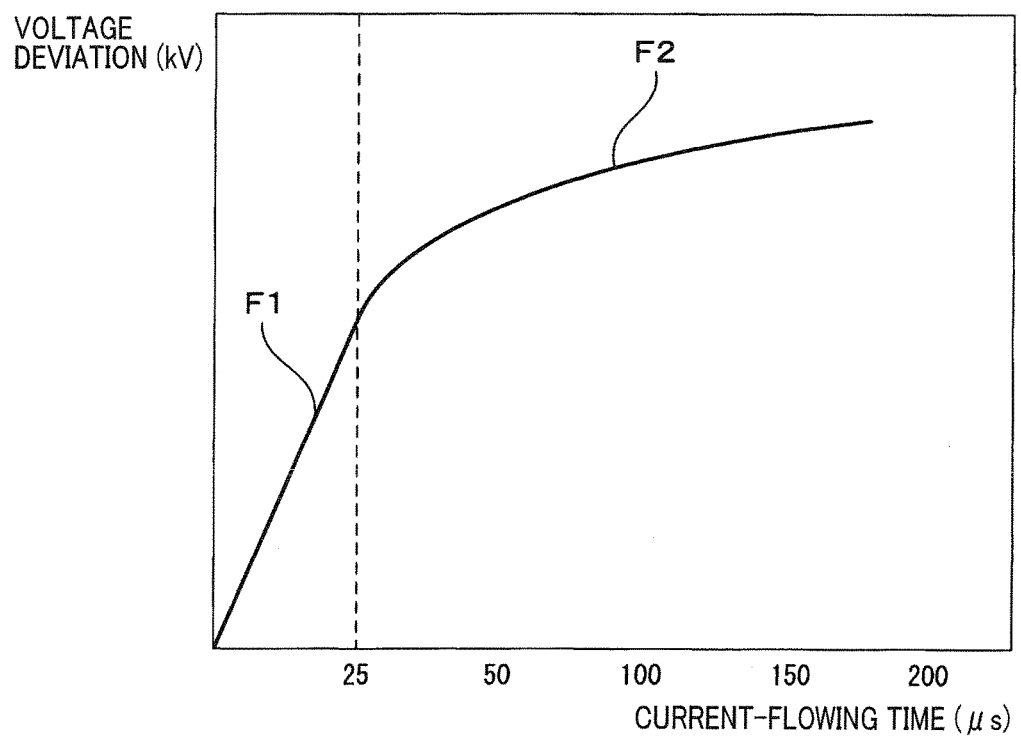
FIG. 4 is a graph showing a relationship between a voltage deviation and a current-flowing time in the control apparatus according to the first embodiment of the invention.
Figure 6:
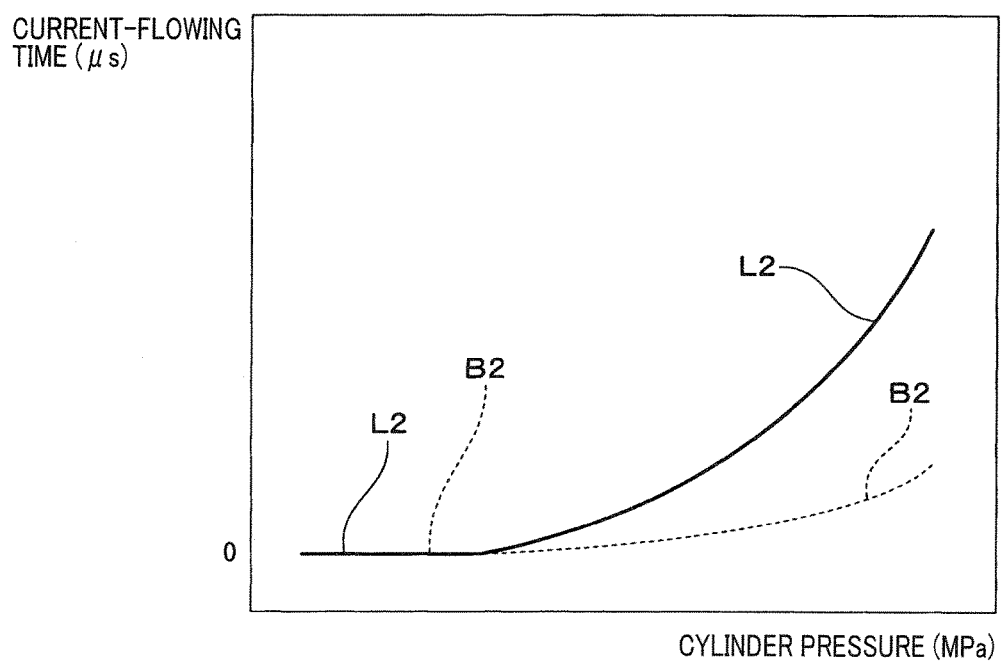
FIG. 6 is a graph showing a relationship between the current-flowing time and the cylinder pressure of the internal combustion engine controlled by the control apparatus according to the first embodiment of the invention.

The relational expressions F1 and F2 are derived based on the relational data shown in each of FIG. 5 and FIG. 6. FIG. 4 is a graph showing a relationship between the current-flowing time t (μs in the horizontal axis) and the voltage deviation $V_Y$ (kV in the vertical axis). It was found that the expression of V=at holds as relational expression F1 in the range of $0 < t \le 25$ μs, and the expression V=bln(t)+c holds as relational expression F2 in the range of $25 < t \le 150$ μs, where a, b and c are constants depending on the types of the spark plug 2 and the internal combustion engine 10.

The operation control circuit 4 can perform a process to reduce the discharge voltage V of the spark plug 2 by changing a controlled variable of an actuator for combustion control of the internal combustion engine 10. The process to reduce the discharge voltage V may be a process to shift the air-fuel ratio of the air-fuel mixture toward the fuel rich side, a process to reduce the supercharging pressure, or a process to advance the ignition timing.

The process to reduce the supercharging pressure is for reducing the cylinder pressure of the internal combustion engine 10 to thereby reduce the discharge voltage V of the spark plug 2. The process to advance the ignition timing is for advancing the timing at which a discharge spark is generated in the spark discharge gap from the compression top dead center. By advancing the ignition timing, the discharge voltage V can be reduced since the cylinder pressure is reduced. The process to shift the air-fuel ratio of the air-fuel mixture toward the fuel rich side is done by increasing the amount of fuel injection from the fuel injection valve 123. The discharge voltage V of the spark plug 2 can be reduced by reducing the air-fuel ratio.

Next, ignition control of the spark plug 2 and the operation control of the internal combustion engine 10 are explained. As shown in (a) in FIG. 3, the operation control circuit 4 applies an ON signal as the ignition signal IGt to the switching element 331. As a result, as shown in (b) in FIG. 3, a current is supplied from the battery 5 to the primary coil 311 to store magnetic energy in the ignition coil 310. In this embodiment, one end of the secondary coil 312 at the side connected to the center electrode 21 becomes positive, and the other end becomes negative when the primary coil is 311 is supplied with a current.

Subsequently, the operation control circuit 4 applies an OFF signal as the ignition signal IGt to the switching element 331 at time t1 as shown in (a) in FIG. 3. As a result, since the switching element 331 is turned off, current supply to the primary coil 311 is stopped, and the output polarity of the secondary coil 312 is reversed with a high voltage being induced across both ends of the secondary coil 312. The induced high voltage is applied to the spark discharge gap of the spark plug 2 through the connection path 31 as shown in (b) in FIG. 3.

When the applied voltage (the voltage applied to the spark discharge gap of the spark plug 2) exceeds the set voltage $V_Z$ of the constant-voltage element 321, since the constant-voltage element 321 become conductive and a voltage drop occurs, the applied voltage is maintained at the set voltage $V_Z$. In this state, an insulation breakdown occurs in the spark discharge gap to generate a discharge spark. The applied voltage of the constant-voltage element 321 is set higher than the discharge voltage V of the brand-new spark plug 2, and lower than the allowable upper limit of the discharge voltage V of the spark plug 2. The allowable upper limit is an upper limit value of the range of the discharge voltage V within which the ignition operation can be performed reliably. The allowable upper limit is determined through a test in which the internal combustion engine 10 is run in various conditions.

Figure 3:
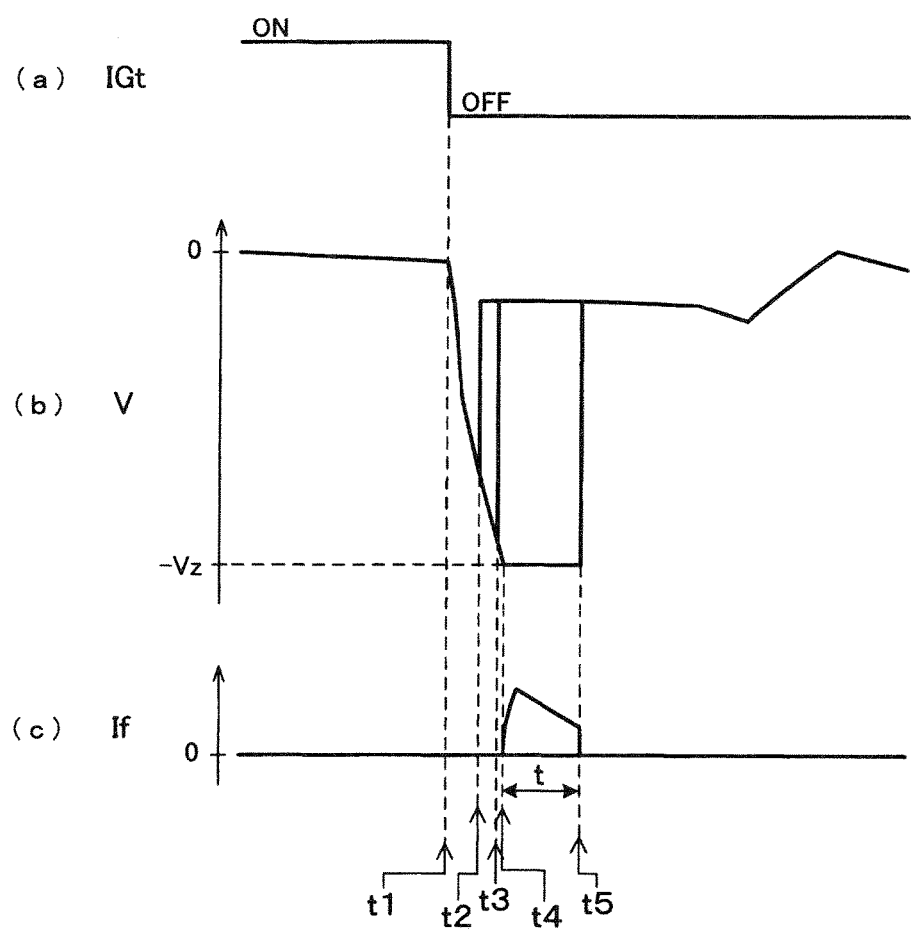
FIG. 3 is a graph showing temporal variations of an ignition signal, a voltage applied to a spark plug and a current passing through a current detecting resistor included in the control apparatus according to the first embodiment of the invention.

When the spark plug 2 is brand new, as shown in (b) in FIG. 3, insulation breakdown occurs in the spark discharge gap to generate a discharge spark at time t2 before the applied voltage reaches the set voltage $V_Z$. As the period for which the spark plug 2 has been used increases, the spark discharge gap increases and wear of the center electrode 21 increases causing the discharge voltage V to increase. As a result, the time at which a discharge spark is generated is delayed from time t2 (to time t3 or t5, for example) as shown in FIG. 3.

If it comes to time t4 before a spark discharge is generated, the discharge voltage V reaches an increased voltage $V_X$ higher than the set voltage $V_Z$ of the constant-voltage element 321 as shown in (b) in FIG. 3. As a result, the constant-voltage element 321 becomes conductive and a current flows through the constant-voltage path 32, causing a voltage drop. At this time, the operation control circuit 4 measures the current-flowing time t during which a current flows through the resistor 322. Subsequently, the operation control circuit 4 calculates the voltage deviation $V_Y$ based on the measured current-flowing time t using the relational expressions F1 and F2, and performs the process to reduce the discharge voltage V of the spark plug 2 by changing the controlled variable of the actuator for combustion control of the internal combustion engine 10 in accordance with the calculated voltage deviation $V_Y$. As described in the foregoing, the process to reduce the discharge voltage V may be the process to shift the air-fuel ratio of the air-fuel mixture toward the fuel rich side, the process to reduce the supercharging pressure, or the process to advance the ignition timing.

The internal combustion engine control apparatus 1 described above provides the following advantages. The control apparatus 1 is capable of changing the operating condition of the internal combustion engine 10 depending on the current-flowing time t. Since the current-flowing time t varies depending on the degree of deterioration of the spark plug 2, it is possible to estimate the degree of deterioration of the spark plug 2 by measuring the current-flowing time t. It is possible to suppress degradation of the ignition performance due to deterioration of the spark plug 2 by changing the operating condition of the internal combustion engine 10 in accordance with the degree of deterioration of the spark plug 2, so that the ignition performance can be maintained at a sufficiently high level despite deterioration of the spark plug 2.

The operation control circuit 4 stores the relationship between the current-flowing time t and the voltage deviation $V_Y$ between the set voltage VZ and the increased discharge voltage $V_X$ increased from the set voltage $V_X$ due to deterioration of the spark plug 2, and changes the operating condition of the internal combustion engine 10 in accordance with the voltage deviation $V_Y$ derived from the measured current-flowing time t. That is, the voltage deviation $V_Y$ can be obtained without directly monitoring the discharge voltage of the spark plug 2. Conventionally, the operating condition of an internal combustion engine is controlled by directly monitoring the discharge voltage of a spark plug mounted on the engine. However, it is difficult to directly monitor the discharge voltage of the spark plug in a case where the engine is small in size. According to the internal combustion engine control apparatus 1 described above, it is possible to control the operating condition of an internal combustion engine by measuring the current-flowing time t even if the engine is small in size.

The operation control circuit 4 stores the relational expressions F1 and F2 derived from the relational data, and obtains the voltage deviation $V_Y$ from the current-flowing time t using the relational expressions F1 and F2. Accordingly, the amount of data to be stored in the operation control circuit 4 can be small. Further, since the relational expressions F1 and F2 can represent the relationship between the current-flowing time t and the voltage deviation $V_Y$ in a continuous manner, the voltage deviation $V_Y$ can be derived with high accuracy in accordance with the measured current-flowing time t.

The operation control circuit 4 performs the process to reduce the discharge voltage V of the spark plug 2 by changing the controlled variable of the actuator for combustion control of the internal combustion engine 10, so that the spark plug 2 can generate a discharge spark easily to thereby prevent a misfire in the internal combustion engine 10.

As described above, according to the internal combustion engine control apparatus 1, it is possible to run an internal combustion engine steadily even if a spark plug mounted on the engine has been deteriorated.

Second Embodiment

Figure 7:
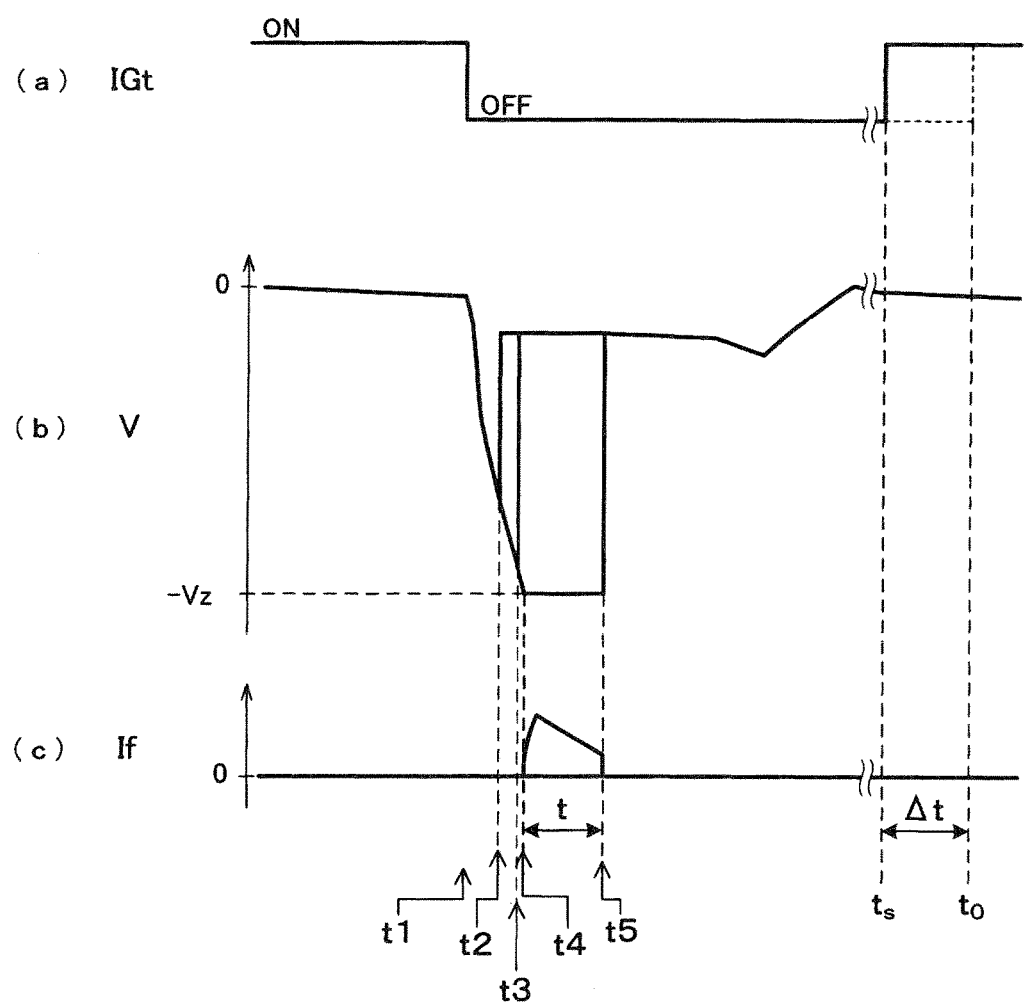
FIG. 7 is a graph showing temporal variations of an ignition signal, a voltage applied to a spark plug and a current passing through a current detecting resistor included in a control apparatus according to a second embodiment of the invention.

Next, a second embodiment of the invention is described with reference to FIG. 7. The second embodiment differs from the first embodiment in part of the structure of the operation control circuit 4. In the second embodiment, the operation control circuit 4 is configured to increase the energy to be supplied to the primary coil 311. As shown in (a) in FIG. 7, the timing at which power supply to the primary coil 311 is started is changed from time t0 set for the brand new spark plug 2 to time ts earlier than time t0 by Δt (μs) to lengthen the power supply time period. Alternatively, to increase the energy to be supplied to the primary coil 311, a device for stepping up the battery voltage may be disposed in the connection path between the battery 5 and the primary coil 311, so that the amount of the current flowing to the primary coil 311 is increased for the same power supply time period to thereby increase the electric energy accumulated in the ignition coil 310. The device for stepping up the battery voltage may be a DC-DC converter. The second embodiment provides the same advantages provided by the first embodiment.

Third Embodiment

Figure 8:
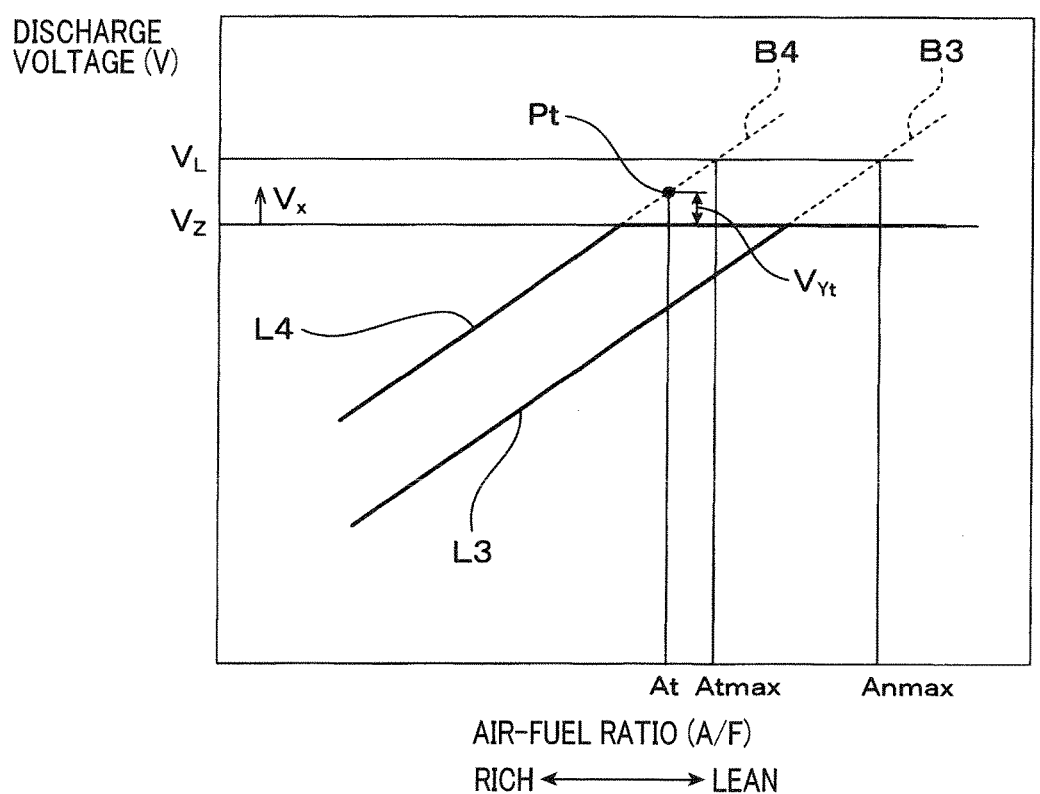
FIG. 8 is a graph showing a relationship between the discharge voltage and an air-fuel ratio of an internal combustion engine controlled by a control apparatus according to a third embodiment of the invention.

Next, a third embodiment of the invention is described with reference to FIG. 8. The internal combustion engine control apparatus according to the third embodiment stores air-fuel ratio data showing a relationship between the air-fuel ratio and the voltage deviation, and a limit discharge voltage $V_L$. FIG. 8 is a graph showing a relationship between the discharge voltage V of the spark plug 2 and the air-fuel ratio of the internal combustion engine 10. The vertical axis and the horizontal axis of this graph represents the discharge voltage V and the air-fuel ratio (A/F), respectively. The solid line L3 shows how the discharge voltage V of the brand new spark plug 2 varies with the increase of the air-fuel ratio when the constant-voltage element 321 is provided. The broken line B3 shows how the discharge voltage V of the brand new spark plug 2 varies with the increase of the air-fuel ratio when the constant-voltage element 321 is not provided. The solid line L4 shows how the discharge voltage V of the deteriorated spark plug 2 varies with the increase of the air-fuel ratio when the constant-voltage element 321 is provided. The broken line B4 shows how the discharge voltage V of the deteriorated spark plug 2 varies with the increase of the air-fuel ratio when the constant-voltage element 321 is not provided.

The limit discharge voltage $V_L$ is a voltage above which an effective discharge does not occur at an appropriate timing even after the set voltage VZ has been reached. That is, if the discharge voltage V exceeds the limit discharge voltage $V_L$, it may occur that no discharge is produced in the spark plug 2, or the ignition timing is delayed causing output abnormality of the engine. The limit discharge voltage $V_L$ may be calculated from the relative expression F2, or determined in advance through experiment. When the limit discharge voltage $V_L$ is calculated from the relative expression F2, the convergence value of the discharge voltage V is determined to be the limit discharge voltage $V_L$. For the spark plug 2 to perform ignition at the appropriate timing, the voltage deviation $V_Y$ between the limit discharge voltage $V_L$ and the set voltage $V_Z$ is set smaller than 10 kV preferably. More preferably, it is set smaller than 5 kV.

In this embodiment, the operation control circuit 4 stores the relational expressions F1 and F2 derived from the relational data as shown in FIG. 4, and stores air-fuel ratio data showing a pre-obtained relationship between the discharge voltage V and the air-fuel ratio as shown in FIG. 8. As shown by the solid line L3 and the broken line B3 in FIG. 8, the discharge voltage V increases linearly as the ratio of air to fuel increases, that is, as the air-fuel ratio shifts toward the lean side. If the constant-voltage element 321 is not provided in the connection circuit 31, the spark plug 2 is applied with a voltage higher than the set voltage $V_Z$ when the discharge voltage V reaches the increased voltage $V_X$ higher than the set voltage $V_Z$.

As shown by the solid line L4 and the broken line B4 in FIG. 8, when the spark discharge gap increases due to deterioration of the spark plug 2, the discharge voltage V increases compared to that when it is brand new. Incidentally, it was found that the proportional relationship between the discharge voltage V and the air-fuel ratio when the spark plug 2 has been deteriorated is the same as that when it is brand new.

Next, a procedure for obtaining the degraded air-fuel ratio data (the solid line L4 and the broken line 34) using the air-fuel ratio data (the solid line L3 and the broken line 33) is explained. The operation control circuit 4 starts to measure the current-flowing time t at the moment when the discharge voltage V of the spark plug 2 reaches the increased discharge voltage $V_X$ and a current starts to flow through the constant-voltage path 32. In FIG. 8, the timing at which the discharge voltage V reaches the increased discharge voltage $V_X$ corresponds to time t4 in FIG. 3.

Subsequently, the operation control circuit 4 obtains the voltage deviation $V_Y$ from the measured current-flowing time t using the relational expressions F1 and F2. Concurrently, the operation control circuit 4 obtains data showing the air-fuel ratio of the internal combustion engine 10 when measuring the current-flowing time t. The air-fuel ratio can be determined based on the output of the air-fuel ratio sensor 131. Here, the obtained air-fuel ratio is denoted by At.

As a result, a point Pt at which the air-fuel ratio becomes At and the voltage deviation becomes $V_{yt}$ is obtained. By drawing a straight line which passes through this point Pt and is parallel to the solid line L3 and the broken line B3 representing the air-fuel ratio data of the brand new spark plug 2, the solid line L4 and the broken line B4 representing the degraded air-fuel ratio data of the deteriorated spark plug 2 are obtained.

Further, the operation control circuit 4 obtains a limit value of the air-fuel ratio of the deteriorated spark plug 2 using the degraded air-fuel ratio data (the solid line L4 and the broken line B4) and the limit discharge voltage $V_L$. The limit value of the air-fuel ratio is a value at which the discharge voltage V becomes equal to the limit discharge voltage $V_L$. Accordingly, the limit value of the air-fuel ratio of the deteriorated spark plug 2 is equal to $At_{max}$. Accordingly, the operation control circuit 4 controls the amount of fuel injection by the fuel injection valve 123 such that the air-fuel ratio is maintained lower than the limit value $At_{max}$ as shown in FIG. 8. Incidentally, a limit value of the air-fuel ratio of the brand new spark plug is $An_{max}$.

As described above, in this embodiment, the operation control circuit 4 uses both the air-fuel ratio data and the relational data to control the air-fuel ratio in accordance with the degree of deterioration of the spark plug 2. Therefore, the internal combustion engine control apparatus 1 of this embodiment can maintain the ignition performance of the spark plug 2 to achieve an optimum combustion environment even when the internal combustion engine 10 is a lean burn engine with a supercharger.

Incidentally, if the internal combustion engine control apparatus 1 stores a table, map data or relational expressions for conversion between the discharge voltage and the air-fuel ratio, the above described control can be performed more rapidly. The above described embodiments are configured to control the internal combustion engine 10 using the air-fuel ratio data. However, the above described embodiments may be modified to control the internal combustion engine 10 using data representing the rotational speed of the internal combustion engine 10 or the opening degree of the throttle. The above embodiments may be provided with a function of detecting the degree of deterioration of the spark plug based on the current-flowing time t or the voltage deviation and encouraging the user to replace the spark plug as necessary.

The above explained preferred embodiments are exemplary of the invention of the present application which is described solely by the claims appended below. It should be understood that modifications of the preferred embodiments may be made as would occur to one of skill in the art.

What is claimed is:

1. A control apparatus for an internal combustion engine with a spark plug having a center electrode and a ground electrode disposed so as to form a spark discharge gap therebetween, comprising:

a voltage applying section for applying a voltage to the spark discharge gap;

a constant-voltage path including a constant-voltage element parallel-connected to the spark discharge gap of the spark plug for preventing the spark discharge gap from being applied with a voltage higher than a set voltage; and an operation control circuit for controlling an operating condition of the internal combustion engine; wherein the operation control circuit configured to measure a current-flowing time during which a current flows through the constant-voltage path when a voltage higher than the set voltage is applied to the constant-voltage path, and change the operation condition of the internal combustion engine in accordance with the measured current-flowing time; and the operation control circuit stores pre-obtained relational data showing a relationship between the current-flowing time and a voltage deviation between the set voltage and an increased discharge voltage increased from the set voltage due to deterioration of the spark plug, and is configured to obtain the voltage deviation from the measured current-flowing time and to change the operating condition of the internal combustion engine in accordance with the obtained voltage deviation.

2. The control apparatus for an internal combustion engine according to claim 1, wherein the operation control circuit stores at least one relational expression derived from the relational data, and calculates the voltage deviation from the measured current-flowing time using the relational expression.

3. The control apparatus for an internal combustion engine according to claim 1, wherein the operation control circuit stores air-fuel ratio data showing a pre-obtained relationship between an air-fuel ratio of the internal combustion engine and a discharge voltage of the spark plug, calculates a limit discharge voltage depending on a degree of deterioration of the spark plug from the voltage deviation and the air-fuel ratio data, determines, based on the calculated limit discharge voltage, a limit value of the air-fuel ratio above which a misfire occurs in the spark plug, and controls the internal combustion engine such that the air-fuel ratio is maintained smaller than the limit value.

4. The control apparatus for an internal combustion engine according to claim 1, wherein the voltage applying section includes an ignition coil having primary and secondary coils magnetically coupled to each other, the operation control circuit being configured to be capable of performing a process to increase electric energy to be supplied to the primary coil.

5. The control apparatus for an internal combustion engine according to claim 1, wherein the operation control circuit is configured to be capable of performing a process to reduce a discharge voltage of the spark plug by changing a controlled variable of an actuator for combustion control of the internal combustion engine.

\* \* \* \* \*